No. 641,419. Patented Jan. 16, 1900.
H. C. WHEELER.
AGITATOR.
(Application filed Nov. 16, 1898.)
(No Model.) 2 Sheets—Sheet 2.
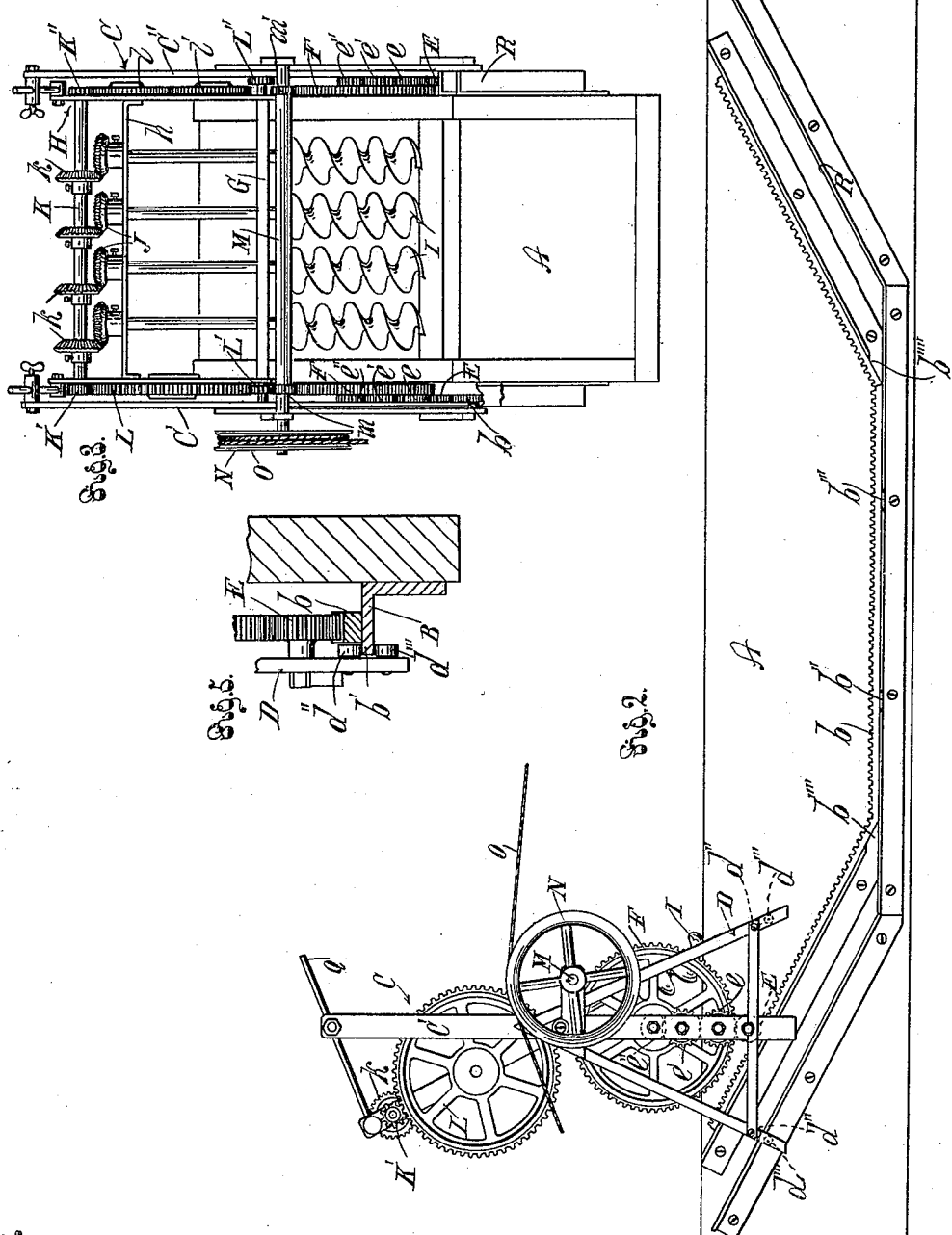
Witnesses
Henry Kingman.
E. A. Waterman.
Inventor
Henry Clay Wheeler
by Townsend Bros
his attys

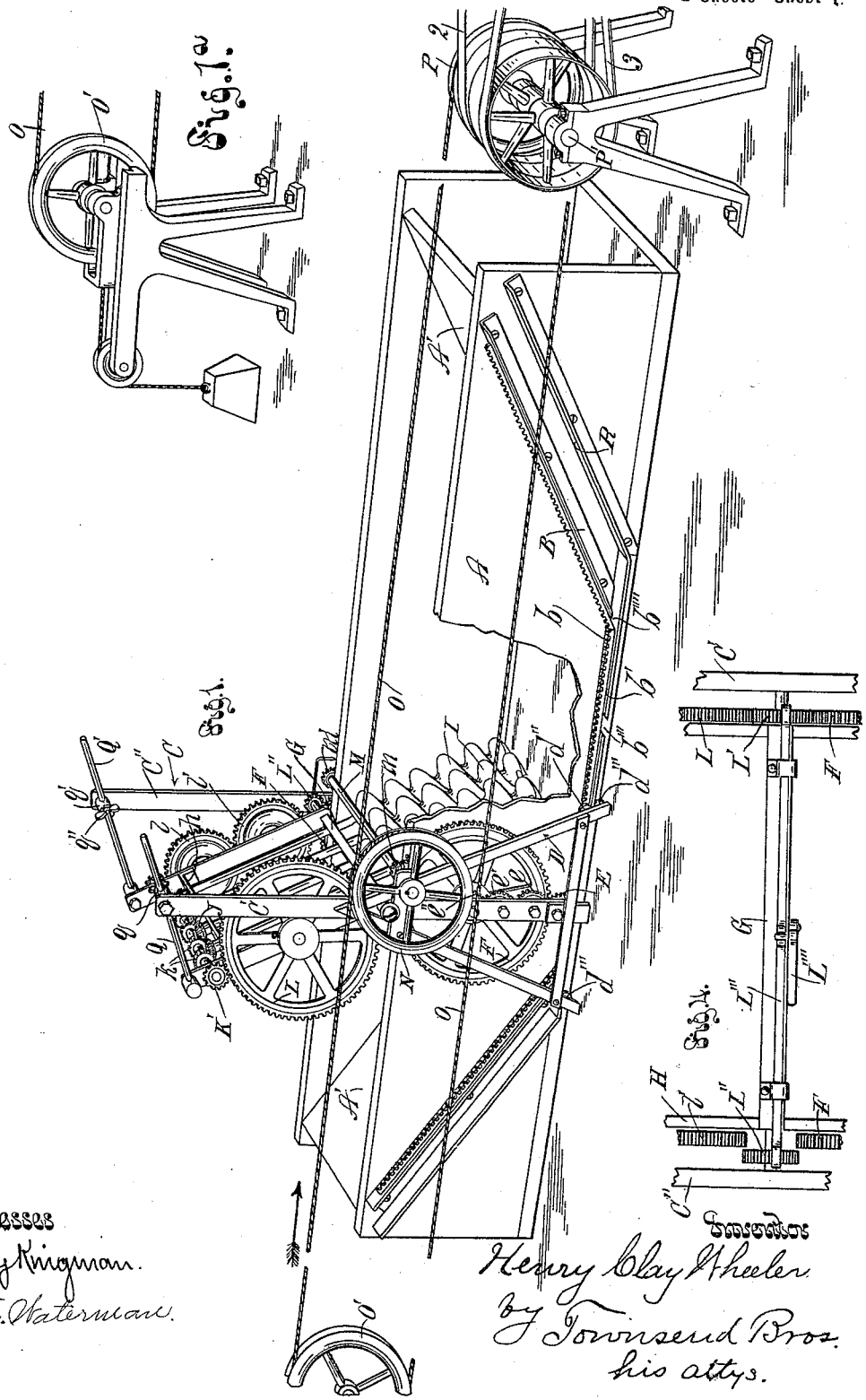

UNITED STATES PATENT OFFICE.

HENRY CLAY WHEELER, OF WINCHESTER, CALIFORNIA.

AGITATOR.

SPECIFICATION forming part of Letters Patent No. 641,419, dated January 16, 1900.

Application filed November 16, 1898. Serial No. 696,636. (No model.)

*To all whom it may concern:*

Be it known that I, HENRY CLAY WHEELER, a citizen of the United States, residing at Winchester, in the county of Riverside and State of California, have invented new and useful Improvements in Agitators, of which the following is a specification.

My invention relates to those machines which are designed to agitate and thoroughly mix and incorporate together various ingredients.

My invention is particularly designed for the purpose of thoroughly agitating and mixing crushed ores, in combination with cyanid and other solutions, so as to insure the thorough and proper application of the solution to all parts of the ore and to allow the ready filtration of the liquid therefrom. Incidentally my invention is adapted for use in agitating or mixing into a homogeneous mass any articles which necessitate such treatment.

One particular object of my invention is to provide a device of this kind in which the agitators and mixers will traverse the entire length of a vat, thoroughly mixing and stirring all portions of the contents of the vat during their travel therethrough, and whereby at each end of the vat the machine will automatically travel upward out of the vat, so as to remove the agitators from the chemically-saturated mixture.

My invention is particularly adapted for treatment of slimy ores, and by its use the heavier material is carried from the bottom of the vat to the surface thereof and is deposited upon the slimes which float upon the surface of the mixture, which are thereby carried beneath the surface and thoroughly and intimately mixed and incorporated with the solution and the balance of the material being treated.

My invention comprises the various features of construction and combinations of parts, hereinafter fully set forth and claimed, whereby I accomplish the objects hereinbefore specified.

The accompanying drawings illustrate my invention.

Figure 1 is a perspective side elevation of a machine embodying my invention. Fig. 1ª illustrates the tension device, a fragment of which is shown in Fig. 1. Fig. 2 is a plain side elevation of the same. Fig. 3 is an end view of the same, shown slightly in perspective to illustrate the construction more clearly. Fig. 4 is a detail of the gear-shifting device for reversing the travel of the agitators. Fig. 5 is a section of the cog-rack and flange-rail.

In the drawings, A represents a vat which is preferably provided with inclined ends A', as shown in the drawings. It is, however, to be understood that my invention may be used in vats not provided with inclined ends and that my claims cover the use of the mechanism, broadly, in any vat. Upon each side of this vat I provide a track-rail B, which is preferably provided with a cog-rack $b$ and a flange $b'$, projecting outwardly beyond the rack, as shown in Fig. 5.

C is a carrier which comprises a supporting-frame which is composed of two uprights C' C'', carrying duplicate driving mechanism upon opposite sides thereof, so that a description of the mechanism of one side will serve for both sides. The frame is composed of two uprights C' C'', each upright having at its base a substantially triangular frame D, projecting front and back, and having at each end two antifriction or bearing rollers $d''$ $d'''$, which are adapted to engage between them the projecting flanges $b'$ of the track. The track is inclined at each end to correspond to the inclination of the end of the vat, and a pinion E is journaled to the face of each standard or upright and adapted to mesh with and travel upon the cog-rack $b$. A train of gearings $e$ $e'$ connects the pinion E with a pinion $e''$, which is rigidly secured to a driving cog-wheel F.

Directly above the cog-wheels F is arranged a supporting-bar G, which is journaled at each end in the uprights C' C''. Secured to this bar and extending upward therefrom is an agitator-frame H, which is provided with a cross-bar $h$ parallel with the cross-bar G, and in the cross-bars $h$ and G are journaled the shanks or stocks of a series of screw-conveyers I, which project below the bar G and are adapted to enter the vat. Each of the screw-conveyers is provided with a beveled pinion J, and upon a transverse shaft K are mounted corresponding beveled pinions $k$, which mesh with the beveled pinions of the conveyers. Upon one end of the shank K is secured a pinion K', which meshes with an intermediately-arranged gear-wheel L, which meshes with a small pinion L', which is journaled upon the bar G and in turn meshes with the cog-wheel F. Upon the other end of the shaft is fixed a pinion K'', which meshes with a cog-wheel $l$, which is journaled to the frame H and meshes with a second cog-wheel $l'$, which is also journaled to the frame H and meshes with a pinion L'', which is journaled upon the bar G and meshes with the other wheel F. The pinions L' and L'' thus have their axes in line with the axis of the bar G. The pinions L' L'' are connected with each other by a bar L''', operated by a lever L'''', and can slide upon the bar G, so that one pinion can be thrown into gear and by the same motion the other pinion will be thrown out of gear. Between the pinion L' and pinion K' but one gear-wheel is interposed, while two gear-wheels are interposed between the pinion L'' and pinion K''. This is for the purpose of permitting the direction of travel of the mixing device to be reversed without reversing the direction of rotation of the conveyers—that is to say, if the conveyers rotate to drive the material downward instead of carrying it upward the material will pack and eventually lock the machine against further operation.

Journaled in suitable supports secured to the uprights C' C'' is a transverse shaft M, upon which are mounted two driving-pinions $m$ $m'$, respectively, which engage with and drive the gear-wheels F. Upon the shaft M is rigidly fixed a driving-wheel N, around which is trained a cable O, one end of which passes around an idler O' and the other end of which is trained around a driving band-wheel P, which is mounted upon a shaft P' and is driven by any suitable power. Suitable idle and fixed pulleys are provided and operated by a straight belt 2 and a cross-belt 3, so that by shifting the belts the direction of rotation of the band-wheel P can be reversed.

The frame H, together with the conveyers and their attendant mechanism, is pivotally secured to the standards C' C'' by the bar G being journaled thereto, so that such frame can be swung to the front or to the rear, as may be desired, the gear-wheels or pinions L' L'' permitting the frame to swing in either direction without disconnecting the shaft K from the power. Suitable means for adjustably securing the frame in position may be provided—such, for instance, as the adjusting-arms Q Q', passing through suitable socket-pieces $q$ $q'$ and secured by means of thumb-screws $q''$ or any other suitable means. The socket-pieces $q$ $q'$ are rotatable, so that the frame may be tilted or inclined in either direction or may be arranged in a perpendicular position, if deemed desirable.

In the flange $b$ of the track are provided openings $b''$ $b'''$, which are adapted to allow the bottom antifriction supporting-roller of each pair of rollers to pass through and above and to thereby become disengaged from its engagement with the flange when the frame H starts upon its upward travel at either end of the vat or to pass downward through and to pass below the flange when the frame reaches the bottom of the inclined track—that is to say, in order to maintain the uprights C' C'' in a vertical position while the carrier is traveling up the inclined portion of the track at the ends of the vat it becomes necessary to release one set of the antifriction-rollers from its engagement with the flange $b'$ and to carry the other set of rollers into engagement with a supplemental track R, which is secured to the ends of the vat upon both sides thereof parallel with and at a distance below the inclined portion of the track B. The flanges $b'$ are also, as shown at $b''''$, cut away at the angle where the incline starts from the horizontal line, so as to allow the advance set of antifriction-rollers to pass through the flange $b'$ and to engage with and travel along the auxiliary track-flange R. The distance at which the antifriction-rollers are arranged from the vertical axis of each of the uprights C' C'' is such that when the pinion E is traveling upon the inclined portion of the rack $b$ and the antifriction-rollers are traveling upon the supplemental flange-track the uprights will be held in an exact perpendicular position.

In practical operation vats of any suitable size are provided, having the ordinary filter-bottom therein. The ore mixed with chemical solution is placed in the vat, the frame, with its mixing mechanism, being arranged at one end of the track and above the mixture within the vat, as shown in Fig. 2. When the device is in the position shown in Fig. 2, power is applied to drive the cable O in the direction indicated by the arrow, thus to rotate the power-shaft M, the pinions $m$ $m'$, the driving gear-wheels F, and the intermediate pinions and causing the pinions E to engage with the cog-rack $b$, and to thus slowly carry the frame, with its series of conveyers, down into the vat. Through the medium of the gear-wheels L L' and K' the shaft K is rotated, thus rotating the beveled pinions $k$ and the screw-conveyers I. If the frame H is tilted, as shown in the drawings, the screw-conveyers draw the material from the bottom of the vat upward to the top and deposit such material upon the top, thoroughly mixing and agitating the material and causing it to be of practically the same consistency throughout. If the ore is slimy, the heavy material which is drawn from the bottom of the vat is carried upward and by reason of the inclination of the conveyers is drawn toward the rear and deposited upon the surface of the material which is at the rear, thus covering and carrying beneath the surface any slime which may previously be thereupon.

It will be noted that the conveyers are arranged to rotate in one and the same direction, and the material thrown from the advance side of one conveyer is directed upon the opposing conveyer and by it carried to the surface. In practice if the material is thick the rear surface of the mixture will be in the form of windrows, each conveyer leaving its distinct mark upon the surface. When there is more solution in the mixture, no marks will be discernible, but the consistency will be practically the same from the bottom to the top.

When the frame starts upon its downward travel, the advance series of antifriction-rollers are not in engagement with the flanges $b'$ of the track; but when the pinions E reach the bottom of the incline the bottom roller of the advance set of antifriction-rollers is thus allowed to pass downward through the opening $b''$ in the flange $b'$ and upon further forward movement of the frame engage with the under face of the flange, as clearly shown in the drawings. When the frame has traversed the horizontal track, the upper roller of the advance set of antifriction-rollers passes through the slot $b''''$ and into engagement with the auxiliary flange-track R, and when the flange begins its ascent of the inclined portion at the end of the track the lower roller of the rear set of rollers is withdrawn through the slot $b'''$ and travels upward in the same position that the other roller did upon the downward movement at the other end of the tracks.

When the end of the vat is reached, the belts 2 3 are shifted to their idlers, the thumb-screws $q''$ are loosened, and the inclination of the agitator-frame H reversed, the arms Q Q' sliding up through the socket-piece $q$ $q'$ as the frame swings upward and sliding downward as the frame swings downward. When the desired degree of inclination is reached, the arms are secured by the set-screws. Then the lever L'''' is operated to slide the pinion L' out of gear and to slide the pinion L'' into gear. The belts 2 3 are shifted to rotate the power-shaft M in the reverse direction from that in which it rotated previously, thus causing the gear-wheels F to rotate in the opposite direction and to thereby operate the pinions E to carry the carrier in the reverse direction. By reason of the extra gear-wheel $l$, interposed between the pinion L'' and the pinion K'' the shaft K is rotated in the same direction as before, thus carrying the material from the bottom of the vat and depositing it on the top.

If the vat is not filled very full of material, by tilting the frame H sufficiently the agitators can be withdrawn from the mixture without elevating the carrier-frame.

By arranging the supporting-pinions and the guiding-wheels on the inner faces of the supporting standards or uprights C' C'', I am enabled to attach my track to the vat and to allow the guiding-wheels to embrace the flange of the track between them, thus avoiding expense and mechanical difficulties which must be overcome if it is attempted to place the mechanism on the outside of the standards.

Now, having described my invention, what I claim as new, and desire to secure by Letters Patent, is—

1. In an agitator, the combination set forth of a straight vat having inclined ends; a supporting-track arranged parallel with the bottom and the ends of the vat; a carrier adapted to travel upon the track; agitators revolubly supported on the carrier; means for operating the agitators; and means for operating the carrier.

2. In an agitator, the combination set forth of a straight vat having a horizontal bottom and inclined ends; a track arranged parallel with the bottom and having its ends inclined and arranged parallel with the ends of the vat; a carrier adapted to travel upon the track; agitators revolubly supported on the carrier; means for operating the carrier; and means for operating the agitators.

3. In an agitator, the combination set forth of a vat; a track having inclined ends; a supplemental track arranged parallel with the inclined portion of the track; a carrier having supporting-wheels to travel upon the track, and guiding-wheels to travel on the supplemental track; agitators carrried by the carrier; means for operating the carrier, and means for operating the agitators.

4. In an agitator, the vat; the main track having a portion of its length inclined; a carrier having wheels to travel on the track, and supporting-wheels embracing the track between them, the track being provided with openings for the passage of the supporting-wheels; agitators carried by the carrier; and a supplemental track arranged parallel with the inclined portion of the main track and adapted to guide the supporting-wheels when the driving-wheels are upon the inclined portion of the track, and to thereby hold the carrier in the same vertical position during its travel along the track.

5. In an agitator, the combination set forth of the vat; the track provided with the cog-rack; the carrier provided with the pinion meshing with the cog-rack; the first driving-shaft provided with the driving-pinion; the driven cog-wheel meshing with the driving-pinion; the gear-wheels connecting the driven cog-wheel with the pinion meshing with the cog-rack; the agitator-frame journaled or pivoted to the carrier-frame; the second driving-shaft journaled in the agitator-frame; the agitators journaled in the agitator-frame and adapted to be operated by the second driving-shaft; intermediate gearing connecting the second driving-shaft with the driven cog-wheel, one of such gears being journaled with its axis in line with the axis of the pivotal support of the agitator-frame; and means for rotating the first driving-shaft.

6. In an agitator, the combination set forth of a vat having inclined ends; a main track having its ends inclined to correspond to the ends of the vat; a supplemental track corresponding to the inclined ends of the track; a carrier having wheels to travel upon the main
5 track, and guiding-wheels to travel upon the supplemental track when the carrier is traveling up the inclined portion of the main track; agitators carried by the carrier; means for operating the agitators; and means for propelling the carrier along the track.

HENRY CLAY WHEELER.

Witnesses:
 ROBT. L. CARPENTER,
 A. G. HULL.